(12) United States Patent
Honjo et al.

(10) Patent No.: US 11,029,829 B2
(45) Date of Patent: Jun. 8, 2021

(54) INFORMATION PROCESSING APPARATUS AND METHOD FOR DISPLAY CONTROL BASED ON MAGNIFICATION

(71) Applicant: FUJI XEROX CO., LTD., Tokyo (JP)

(72) Inventors: Hiroki Honjo, Yokohama (JP);
Shinichi Nakamura, Yokohama (JP);
Nozomi Noguchi, Yokohama (JP);
Ayaka Ishihara, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 272 days.

(21) Appl. No.: 15/209,592

(22) Filed: Jul. 13, 2016

(65) Prior Publication Data

US 2017/0277410 A1 Sep. 28, 2017

(30) Foreign Application Priority Data

Mar. 22, 2016 (JP) .............................. JP2016-057621

(51) Int. Cl.
*G06F 3/0484* (2013.01)
*H04N 1/00* (2006.01)
(Continued)

(52) U.S. Cl.
CPC ........ *G06F 3/04845* (2013.01); *G06F 3/0482* (2013.01); *G06F 3/04847* (2013.01);
(Continued)

(58) Field of Classification Search
CPC .... G06F 3/048; G06F 3/0481; G06F 3/04817; G06F 3/0482; G06F 3/0483; G06F 3/0484; G06F 3/04842; G06F 3/04845; G06F 3/04847; G06F 3/0485; G06F 3/04886; G06F 2203/04806; G06F 3/14;
(Continued)

(56) References Cited

U.S. PATENT DOCUMENTS

| 6,907,365 B2 * | 6/2005 | Salant ................ G01R 13/0227 702/68 |
| 7,916,157 B1 | 3/2011 | Kelley et al. |

(Continued)

FOREIGN PATENT DOCUMENTS

| CN | 102404498 A | 4/2012 |
| CN | 104156166 A | 11/2014 |

(Continued)

OTHER PUBLICATIONS

Jul. 31, 2018 Office Action issued in European Patent Application No. 16 182 201.0.

(Continued)

*Primary Examiner* — Kieu D Vu
*Assistant Examiner* — Blaine T. Basom
(74) *Attorney, Agent, or Firm* — Oliff PLC

(57) ABSTRACT

An information processing apparatus includes a first display control unit that displays an image on a display unit, a selection unit that selects an operation image from a group of operation images used to receive different operations with respect to the displayed image, depending on a magnification of the displayed image, and a second display control unit that displays the selected operation image on the display unit.

16 Claims, 8 Drawing Sheets

(51) Int. Cl.
   *G06F 3/0482* (2013.01)
   *G06F 3/0488* (2013.01)
(52) U.S. Cl.
   CPC ....... *G06F 3/04886* (2013.01); *H04N 1/0044* (2013.01); *H04N 1/00411* (2013.01); *H04N 1/00427* (2013.01); *H04N 1/00482* (2013.01); *H04N 1/00506* (2013.01); *G06F 2203/04806* (2013.01); *H04N 2201/0094* (2013.01)
(58) Field of Classification Search
   CPC ............. H04N 1/00506; H04N 1/0044; H04N 1/00411; H04N 1/00427; H04N 1/00482; H04N 2201/0094
   USPC ........................................... 345/661; 715/825
   See application file for complete search history.

(56) References Cited

U.S. PATENT DOCUMENTS

| | | | |
|---|---|---|---|
| 8,432,416 B2 * | 4/2013 | Wu | G06F 3/04847 345/661 |
| 8,610,745 B2 * | 12/2013 | Shoji | G06F 3/04886 345/156 |
| 10,019,140 B1 * | 7/2018 | Bell | G06F 3/0484 |
| 2005/0195154 A1 | 9/2005 | Robbins et al. | |
| 2008/0057941 A1 * | 3/2008 | Scott | G06F 1/1626 455/425 |
| 2009/0083665 A1 | 3/2009 | Anttila et al. | |
| 2011/0279363 A1 | 11/2011 | Shoji et al. | |
| 2011/0283227 A1 | 11/2011 | Moore et al. | |
| 2012/0013784 A1 * | 1/2012 | D'Souza | G06F 3/0481 348/333.12 |
| 2013/0080884 A1 * | 3/2013 | Lisse | G06F 3/0483 715/255 |
| 2015/0301635 A1 | 10/2015 | Masuoka | |
| 2016/0307344 A1 * | 10/2016 | Monnier | G06F 3/04845 |
| 2017/0199621 A1 * | 7/2017 | Ishitsuka | G06F 3/0412 |

FOREIGN PATENT DOCUMENTS

| | | |
|---|---|---|
| CN | 104838347 A | 8/2015 |
| JP | H07-241529 A | 9/1995 |
| JP | 2006-146515 A | 6/2006 |
| JP | 2011-14076 A | 1/2011 |
| JP | 2012-133745 A | 7/2012 |
| JP | 2013-131062 A | 7/2013 |
| WO | 2010/063014 A1 | 6/2010 |

OTHER PUBLICATIONS

Jan. 19, 2017 Extended Search Report issued in European Patent Application No. 16182201.0.
Dec. 3, 2019 Office Action issued on Japanese Patent Application No. 2016-057621.
Sep. 30, 2019 Office Action issued in Chinese Patent Application No. 201610662658.8.
Jun. 30, 2020 Office Action issued in Japanese Patent Application No. 2016-057621.

* cited by examiner

FIG. 8

| FILE FORMAT | POSITION OF CENTER POINT |
|---|---|
| IMAGE FILE (Jpeg,bmp, etc.) | CENTER OF TARGET IMAGE DISPLAY SPACE |
| DOCUMENT FILE (pdf,doc, etc.) | UPPER LEFT CORNER OF DOCUMENT |

FIG. 9

| DISPLAY STATE OF RECTANGLE | POSITION OF CENTER POINT |
|---|---|
| CORNER IS DISPLAYED | DISPLAYED CORNER |
| SIDE IS DISPLAYED WHILE CORNER IS NOT DISPLAYED | CENTER OF DISPLAYED SIDE |
| NEITHER CORNER NOR SIDE IS DISPLAYED | CENTER OF TARGET IMAGE DISPLAY AREA |

INFORMATION PROCESSING APPARATUS AND METHOD FOR DISPLAY CONTROL BASED ON MAGNIFICATION

CROSS-REFERENCE TO RELATED APPLICATIONS

This application is based on and claims priority under 35 USC 119 from Japanese Patent Application No. 2016-057621 filed on Mar. 2, 2016.

BACKGROUND

Technical Field

The present invention relates to an information processing apparatus and an information processing method.

SUMMARY

An aspect of the invention provides an information processing apparatus including: a first display control unit that displays an image on a display unit; a selection unit that selects an operation image from a group of operation images used to receive different operations with respect to the displayed image, depending on a magnification of the displayed image; and a second display control unit that displays the selected operation image on the display unit.

BRIEF DESCRIPTION OF THE DRAWINGS

Exemplary embodiments of the present invention will be described in detail based on the following, wherein:

FIG. 8 is a schematic diagram illustrating an instance of a center point table;

FIG. 9 is a schematic diagram illustrating another instance of the center point table.

DETAILED DESCRIPTION

[1] Example

Figure 1:
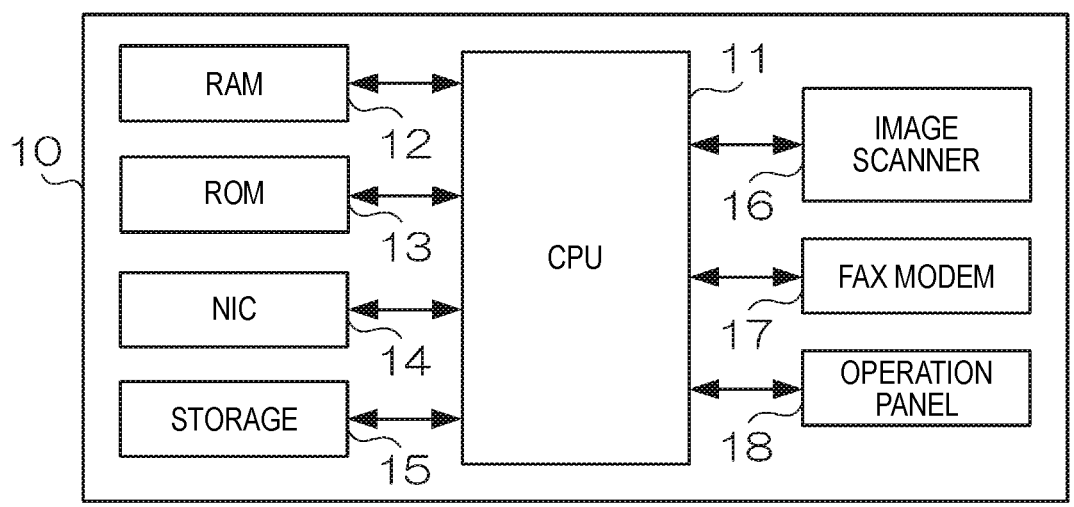
FIG. 1 is a block diagram illustrating a hardware configuration of an image processing apparatus according to an example of the invention.

FIG. 1 illustrates a hardware configuration of an image processing apparatus 10 according to an example of the invention. The image processing apparatus 10 is an information processing apparatus that includes, for example, a scan function or a print function, a copy function, a facsimile function, and performs a process for an image. The image processing apparatus 10 is a computer which includes a central processing unit (CPU) 11, a random access memory (RAM) 12, a read-only memory (ROM) 13, a network interface card (NIC) 14, a storage 15, an image scanner 16, a facsimile modem 17, and an operation panel 18.

The CPU 11 controls operations of the respective units by executing a program stored in the ROM 13 or the storage 15 using the RAM 12 as a work area. The NIC 14 includes a communication circuit and performs communication with external devices. The storage 15 is a storage medium such as a hard disk drive (HDD) or a solid state drive (SSD) and stores data or programs used in the control of the CPU 11.

The image scanner 16 includes an image sensor and the like to optically read out an image displayed on the surface of a sheet. The image scanner 16 supplies image data indicating the read-out image to the CPU 11. The facsimile modem 17 has a communication circuit for facsimile communication and transmits or receives image data to or from a recipient designated by the FAX number. The operation panel 18 has a display and a touch panel provided on a surface of the display. The operation panel 18 serves as a display unit for displaying an image on a display surface and an operation receiving unit for receiving an operation from a user.

The CPU 11 executes a program to control the respective units, so that functions are realized as will be described below.

Figure 2:
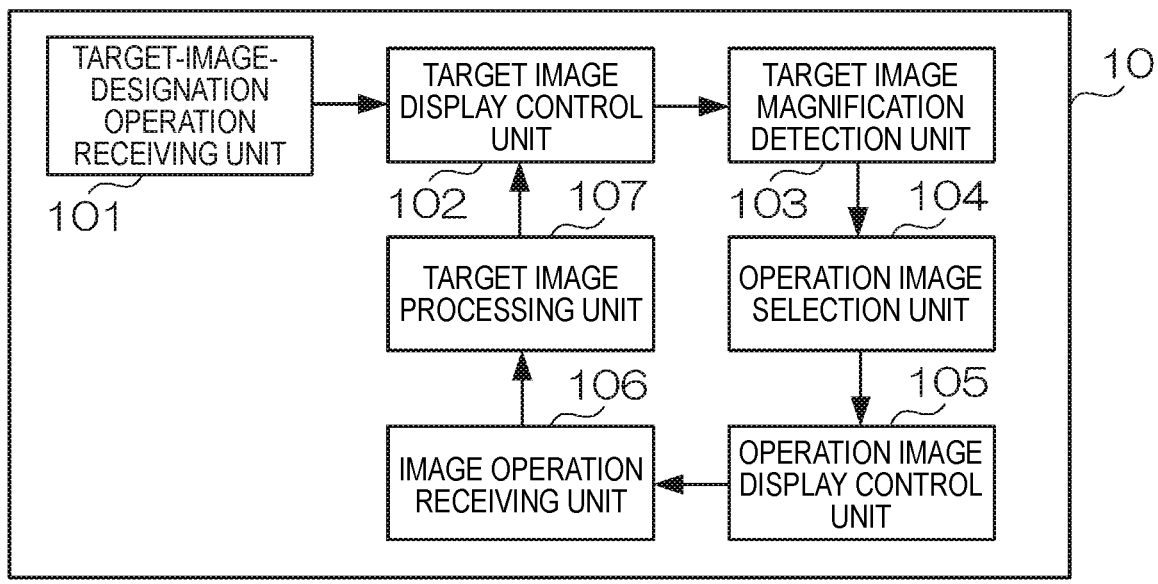
FIG. 2 is a block diagram illustrating a functional configuration to be realized by the image processing apparatus.

FIG. 2 illustrates a functional configuration to be realized by the image processing apparatus 10. The image processing apparatus 10 includes a target-image-designation operation receiving unit 101, a target image display control unit 102, a target image magnification detection unit 103, an operation image selection unit 104, an operation image display control unit 105, an image operation receiving unit 106, and a target image processing unit 107.

The target-image-designation operation receiving unit 101 receives an operation for selecting an image to be displayed (hereinafter, referred to as a "target image) on the operation panel 18 as a display unit. The target-image-designation operation receiving unit 101 receives, for instance, an operation for selecting an image file (such as a portable document format (PDF) file) containing plural images as an operation for selecting a target image.

The target-image-display control unit 102 provides a functionality of displaying an image on a display unit and corresponds to an instance of a "first display control unit" of the present invention. The target image display control unit 102 displays the image selected by the operation received by the target-image-designation operation receiving unit 101.

Figure 3:
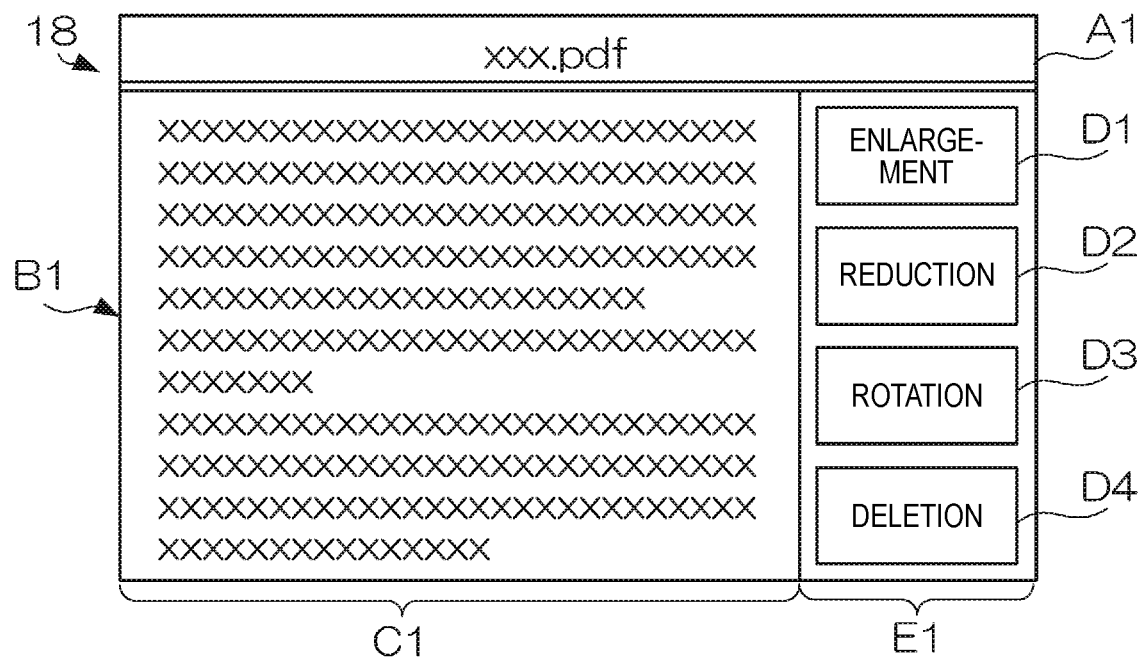
FIG. 3 is a schematic diagram illustrating an instance of a displayed target image.

FIG. 3 illustrates an instance of the displayed target image. In the instance of FIG. 3, the target image display control unit 102 displays a target image B1 having a file name "xxx.pdf" of a target image display screen A1 on a target image display space C1 of the operation panel 18. Although an enlargement operation image D1 and the like are displayed in the vicinity of the target image B1, they will be described below in more detail.

In the instance of FIG. 3, the target image display control unit 102 displays such that a width of the target image B1 matches a width of the target image display space C1. This display mode is referred to as a "width reference display mode." In addition to the width reference display mode, the target image display control unit 102 controls display of the target image using a "page reference display mode" in which a single page of the target image B1 is displayed to match the target image display space C1, a "plural page display mode" in which plural pages of the target image B1 are displayed on the target image display space C1, and a "page enlargement display mode" in which a part of a single page of the target image B1 is enlarged and displayed on the target image display space C1.

The target image display control unit 102 supplies the target image magnification detection unit 103 with information on a display size of the displayed target image and information on an original size of the target image. The information on the display size includes the number of pixels in both vertical and lateral directions of the target image. The information on the original size includes the number of pixels in both vertical and lateral directions when the target image is displayed at a magnification of 100%.

The target image magnification detection unit 103 detects a magnification of the target image displayed under the control of the target image display control unit 102. The target image magnification detection unit 103 detects, as a magnification of the target image, a value obtained by dividing a display size represented in the information supplied from the target image display control unit 102 by the original size represented in the information supplied together. For instance, assuming that the number of pixels in the lateral direction of the display size is set to "300," and the number of pixels in the lateral direction of the original size is set to "400," the target image magnification detection unit 103 detects a value of 0.75 (=300/400) as the magnification of the target image. Assuming that the number of pixels in the lateral direction of the display size is set to "500," and the number of pixels in the lateral direction of the original size is set to "400," the target image magnification detection unit 103 detects a value of 1.25 (=500/400) as the magnification of the target image. The target image magnification detection unit 103 supplies the detected magnification to the operation image selection unit 104.

The operation image selection unit 104 selects an operation image corresponding to the magnification of the displayed target image out of a group of operation images. The operation image selection unit 104 is an instance of the "selection unit" of the invention. The group of operation images refers to a group of images used to receive an operation for the displayed target image and also a group of images used to receive operations different from each other.

Figure 4:
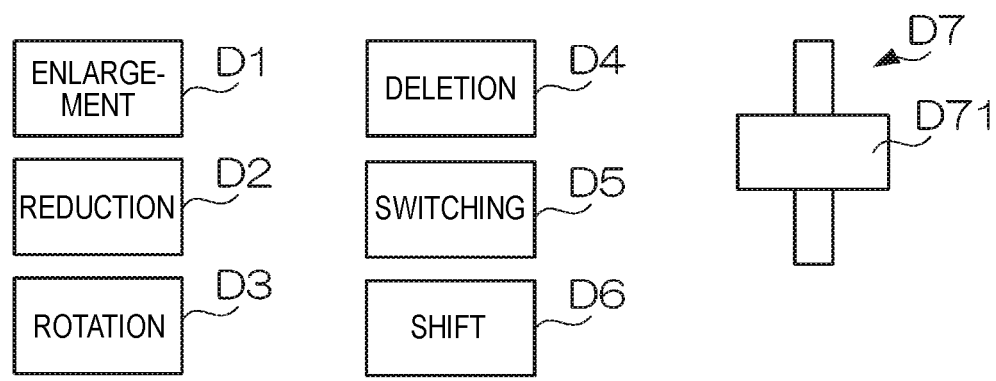
FIG. 4 is a schematic diagram illustrating an instance of a group of operation images.

FIG. 4 illustrates an instance of the group of operation images. In the instance of FIG. 4, an enlargement operation image D1, a reduction operation image D2, a rotating operation image D3, a deletion operation image D4, a switching operation image D5, a shift operation image D6, and a slider operation image D7 are illustrated. The enlargement operation image D1 is an image used to receive an operation for enlarging the displayed target image. The reduction operation image D2 is an image used to receive an operation for reducing the displayed target image.

The size of the displayed target image increases in the order of the "plural page display mode", which has the smallest size, the "page reference display mode", the "width reference display mode", and the "page enlargement display mode". In this regard, when the enlargement operation image D1 is operated, and the target image is displayed in the "plural page display mode," the display mode is changed to the "page reference display mode." When the target image is displayed in the "page reference display mode," the display mode is changed to the "width reference display mode." When the enlargement operation image D1 is operated, and the target image is displayed in the "width reference display mode," the display mode is changed to the "page enlargement display mode". In this manner, the enlargement operation image D1 is used to receive an operation for enlarging the target.

Meanwhile, when the reduction operation image D2 is operated, and the target image is displayed in the "page enlargement display mode," the display mode is changed to the "width reference display mode". When the target image is displayed in the "width reference display mode", the display mode is changed to the "page reference display mode". In addition, when the enlargement operation image D1 is operated, and the target image is displayed in the "page reference display mode," the display mode is changed to the "plural page display mode". In this manner, the reduction operation image D2 is used to receive an operation for reducing the target.

The rotating operation image D3 is an image used to receive an operation for rotating the displayed target image. The deletion operation image D4 is an image used to receive an operation for deleting the displayed target image. The switching operation image D5 is an image used to receive an operation for switching to display an image different from the displayed target image. The shift operation image D6 is an image used to receive an operation for displaying an indication position image representing an indication position when the displayed target image is indicated.

Figure 5A:
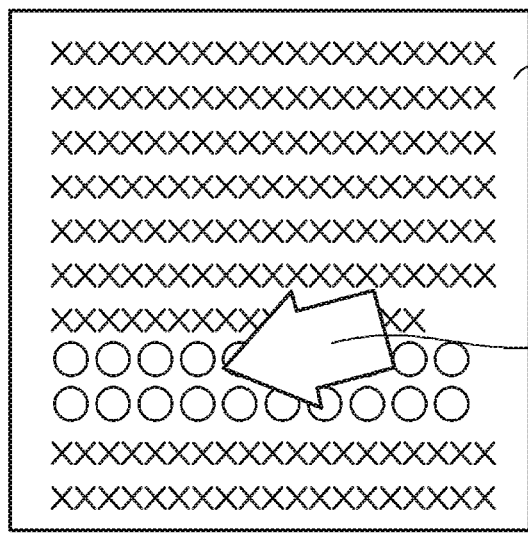
FIGS. 5A and 5B are schematic diagrams illustrating an instance of a displayed indication position image.
Figure 5B:
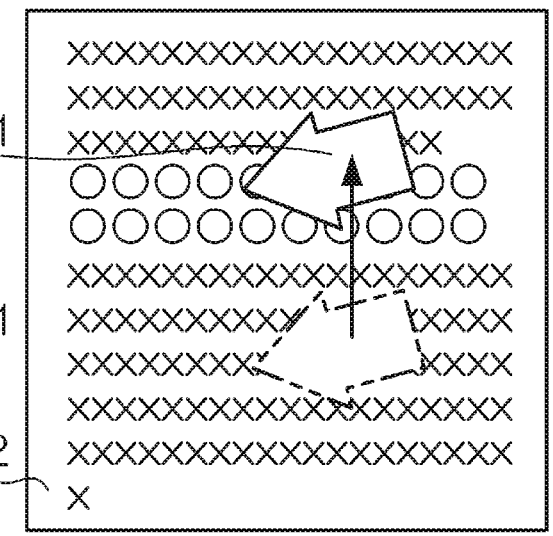

FIGS. 5A and 5B illustrate an instance of the displayed indication position image. In FIG. 5A, an indication position image D61 indicating a position marked as "O" in the target image B2 is displayed. In FIG. 5B, the target image B2 is shifted in combination with the indication position image D61 by shifting the indication position image D61. In this manner, the indication position image D61 is an image used to shift the displayed target image by shifting its own image.

The slider operation image D7 is an image used to receive an operation for changing a size of the displayed target image by changing a position of the slider image D71. While the enlargement operation image D1 and the reduction operation image D2 are used to receive an operation for enlarging and reducing the size through four levels as described above, the slider operation image D7 is used to receive an operation for enlarging and reducing the size through more levels. The slider operation image D7 is used to receive an operation for enlarging and reducing the size from 150% to 500% in the unit of 10% (for instance, 150%, 160%, 170% . . . and 500%), for instance, when the size of the target image in the "page enlargement display mode" is 150% of the original size of the target image.

When the magnification is equal to or higher than a threshold value Th1, the operation image selection unit 104 selects images other than a prescribed first operation image. For instance, the rotating operation image D3 and the switching operation image D5 are selected as the first operation image. The threshold value Th1 is set to, for instance, the magnification at which an outer circumference of the displayed target image is not displayed in the display space of the target image (the target image display space C1 of FIG. 3).

That is, the threshold value Th1 is set to be higher than the magnification of the "width reference display mode" and lower than the magnification of the "page enlargement display mode". As a result, the operation image selection unit 104 may select the first operation image in the "plural image display mode", the "page reference display mode", and the "width reference display mode," but does not select the first operation image in the "page enlargement display mode".

When the magnification is lower than the threshold value Th2, the operation image selection unit 104 selects images other than a prescribed second operation image. For instance, the shift operation image D6 and the slider operation image D7 are selected as the second operation image. The threshold value Th2 is set to, for instance, a value equal to the threshold value Th1 described above. As a result, the operation image selection unit 104 may select the second operation image in the "page enlargement display mode", but does not select the second operation image in the "plural image display mode", the "page reference display mode", and the "width reference display mode".

When the magnification is equal to or higher than a threshold value Th3, the operation image selection unit 104 selects a prescribed third operation image. For instance, the reduction operation image D2, the shift operation image D6, and the slider operation image D7 are selected as the third operation image. The threshold value Th3 is set to, for instance, a value equal to the threshold value Th1 described above. As a result, the operation image selection unit 104 necessarily selects the third operation image in the "page enlargement display mode".

When the magnification is lower than a threshold value Th4, the operation image selection unit 104 selects a prescribed fourth operation image. For instance, the enlargement operation image D1, the rotating operation image D3, and the switching operation image D5 are selected as the fourth operation image. The threshold value Th4 is set to, for instance, a value equal to the threshold value Th1 described above. As a result, the operation image selection unit 104 necessarily selects the fourth operation image in the "plural image display mode", the "page reference display mode," and the "width reference display mode". The operation image selection unit 104 notifies the operation image display control unit 105 of the operation image selected through the aforementioned process.

The operation image display control unit 105 displays the operation image selected by the operation image selection unit 104 on the operation panel 18 as a display unit. The operation image display control unit 105 is an instance of the "second display control unit" of the invention. The operation image display control unit 105 displays the selected operation image in the operation image display space E1 of FIG. 3.

Figure 6A:
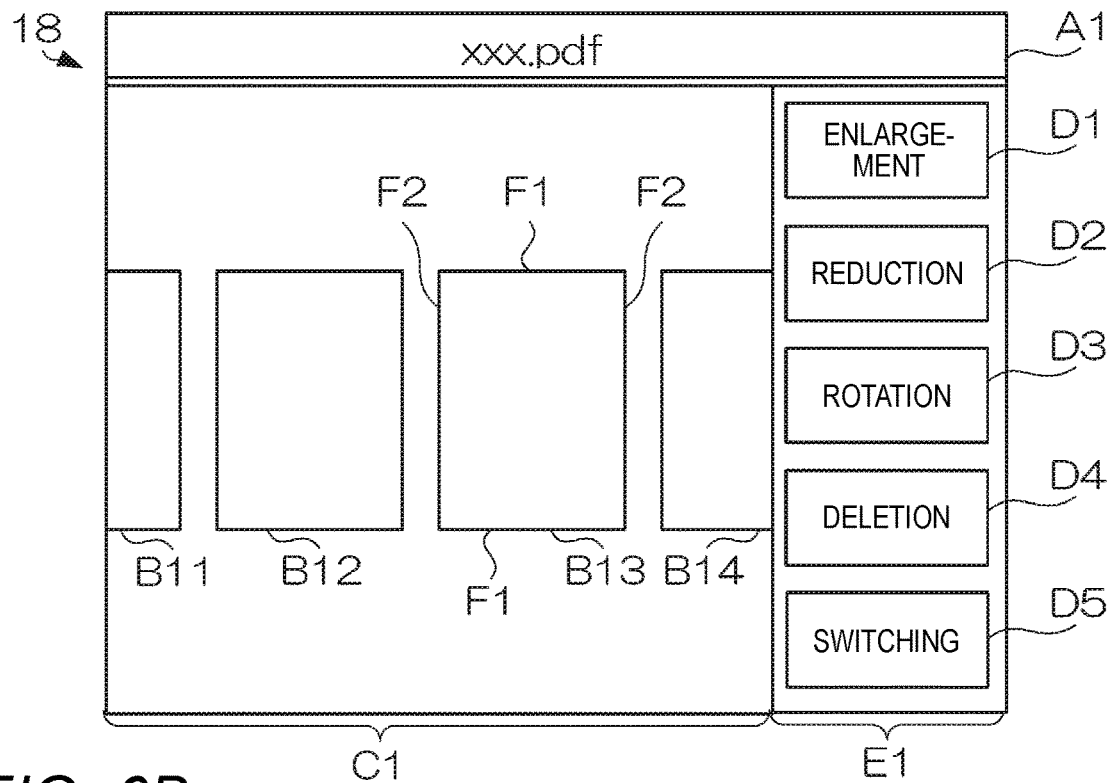
FIGS. 6A to 6D are schematic diagrams illustrating an instance of a displayed operation image.

FIGS. 6A to 6D illustrate an instance of the displayed operation image. In FIG. 6A, the target image display control unit 102 set to the plural page display mode displays plural target images B11, B12, B13, and B14 in the target image display space C1 of the operation panel 18. In this instance, a short side F1 and a long side F2 forming the outer circumference of the target image B13 are displayed, and the magnification of the target image is lower than the threshold values Th1, Th2, Th3, and Th4.

In this regard, the operation image display control unit 105 displays the enlargement operation image D1, the rotating operation image D3, and the switching operation image D5 prescribed as the fourth operation image on the operation image display space E1 of the operation panel 18. In addition, the reduction operation image D2 and the deletion operation image D4 are displayed. Furthermore, the operation image display control unit 105 does not display the shift operation image D6 and the slider operation image D7 prescribed as the second operation image.

Figure 6B:
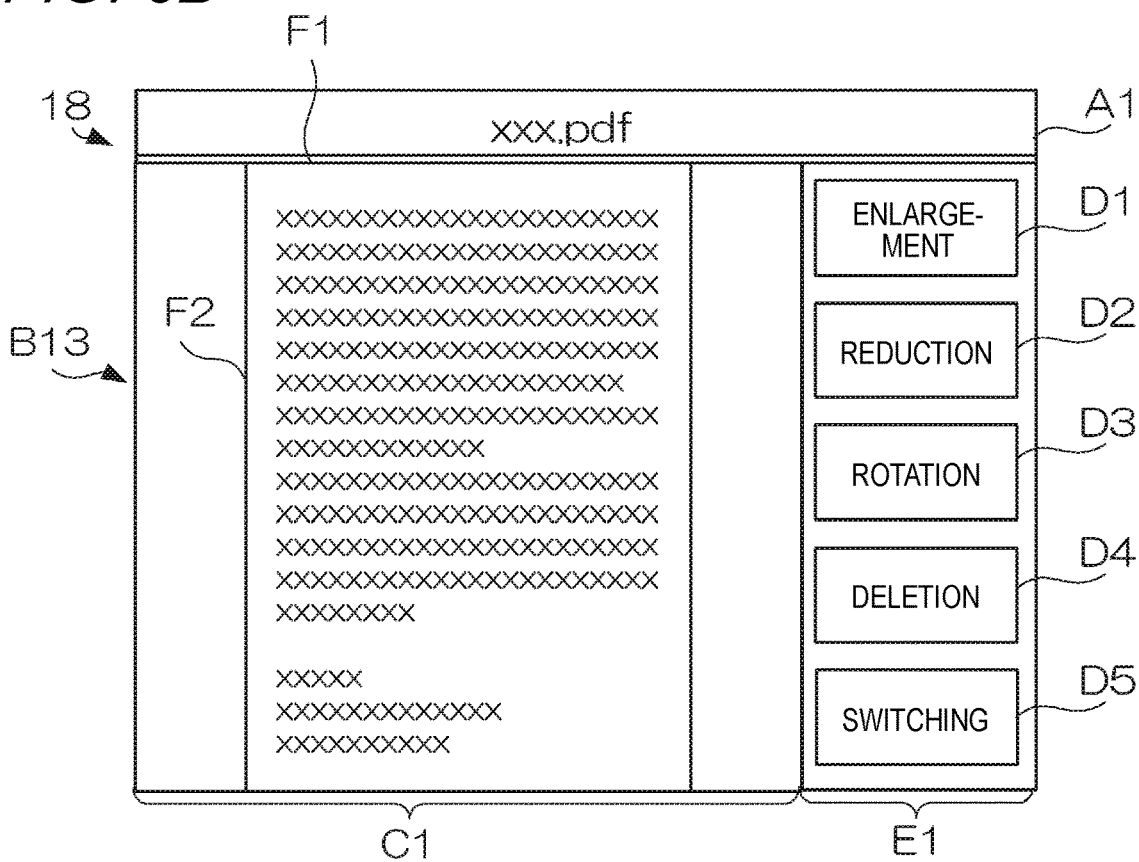

In FIG. 6B, the target image display control unit 102 set in the page reference display mode displays the entire single page of the target image B13 on the target image display space C1 of the operation panel 18. In this instance, a short side F1 and a long side F2 of the target image B13 are displayed, and the magnification of the target image is set to be lower than the threshold values Th1, Th2, Th3, and Th4. In this regard, the operation image display control unit 105 displays the operation images D1 to D5 and does not display the shift operation image D6 and the slider operation image D7 as illustrated in FIG. 6A.

Figure 6C:
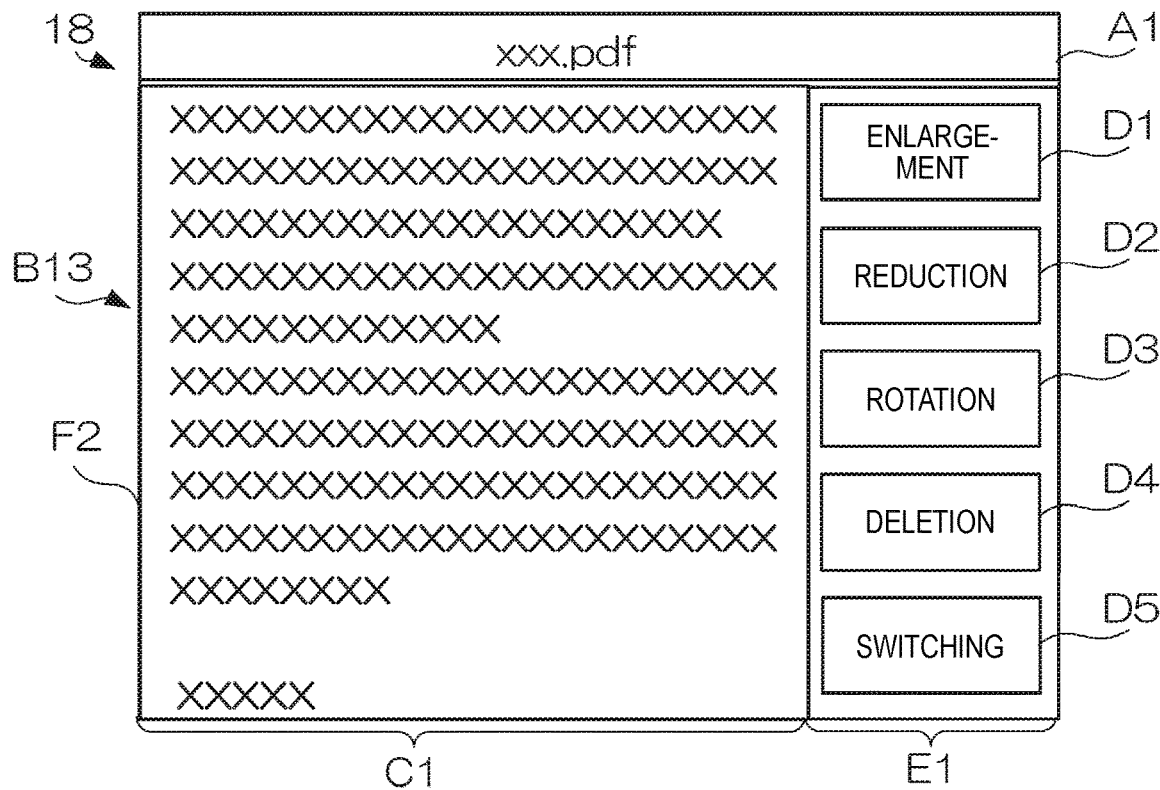

In FIG. 6C, the target image display control unit 102 set in the width reference display mode displays the width of the target image B13 on the target image display space C1 of the operation panel 18 such that the width of the target image B13 matches the width of the target image display space C1. In this instance, a long side F2 of the target image B13 is displayed, and the magnification of the target image is lower than the threshold values Th1, Th2, Th3, and Th4. In this regard, the operation image display control unit 105 displays the operation images D1 to D5 and does not display the shift operation image D6 and the slider operation image D7 as illustrated in FIG. 6A.

Figure 6D:
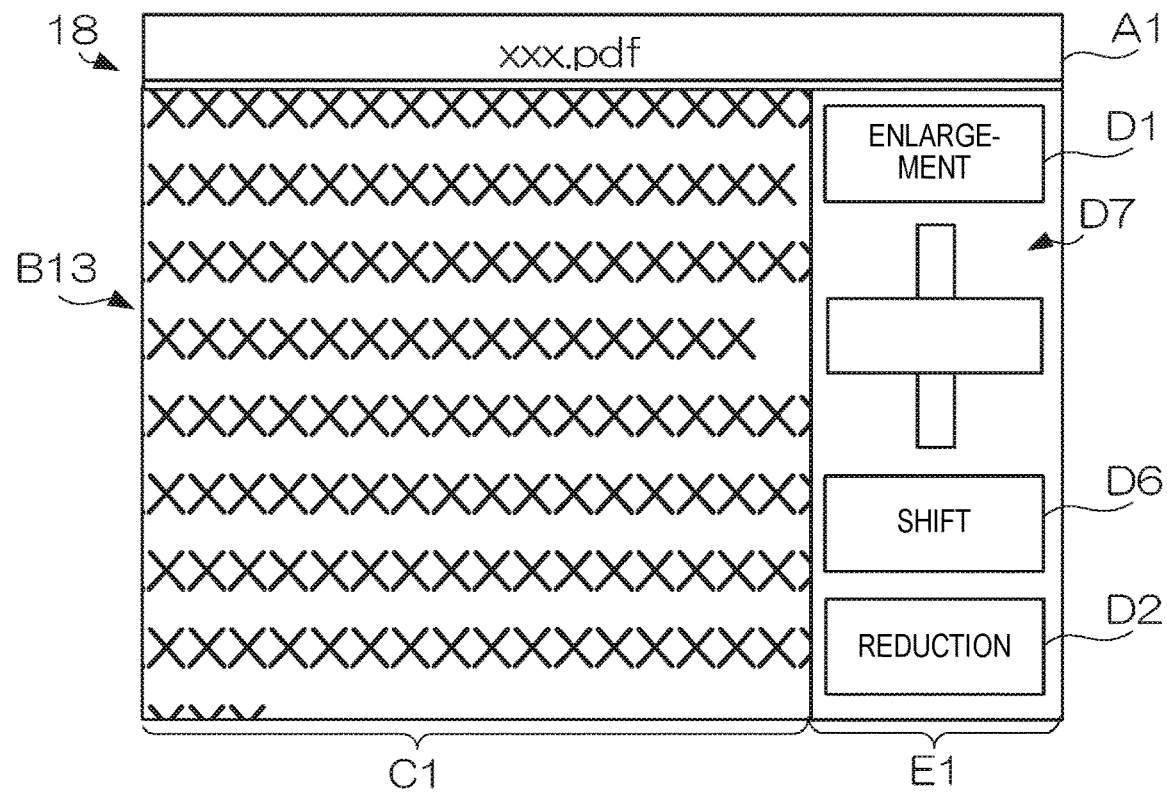

In FIG. 6D, the target image display control unit 102 set in the page enlargement display mode enlarges and displays the target image B13 on the target image display space C1 of the operation panel 18. In this instance, the outer circumference of the target image B13 is not displayed, and the magnification of the target image is set to be equal to or higher than the threshold values Th1, Th2, Th3, and Th4. In this regard, the operation image display control unit 105 displays the reduction operation image D2, the shift operation image D6, and the slider operation image D7 prescribed as the third operation image, and also displays the enlargement operation image D1 in addition thereto. Furthermore, the operation image display control unit 105 does not display the rotating operation image D3 and the switching operation image D5 prescribed as the first operation image.

The operation image display control unit 105 supplies positional information (information representing positions) of each operation image displayed as described above to the image operation receiving unit 106. When the user operates any one of the operation images, the image operation receiving unit 106 receives the operation as an operation for the corresponding operation image based on the supplied positional information. When receiving the operation, the image operation receiving unit 106 notifies the fact to the target image processing unit 107.

The target image processing unit 107 processes the displayed target image depending on the operation image received by the image operation receiving unit 106. For instance, when the enlargement operation image D1 is operated, the target image processing unit 107 performs an enlargement process for the displayed target image and supplies a result of the processing (the enlarged target image) to the target image display control unit 102. The target image display control unit 102 displays the supplied target image, that is, the enlarged target image subjected to the processing of the target image processing unit 107.

For instance, when the rotating operation image D3 is operated, the target image processing unit 107 processes rotation of the displayed target image and supplies a result of the processing (the rotated target image) to the target image display control unit 102. The target image display control unit 102 displays the supplied target image, that is, the rotated target image subjected to the processing of the target image processing unit 107. For instance, when the deletion operation image D4 is operated, the target image processing unit 107 processes deletion of the image file of the displayed target image and notifies the target image display control unit 102 of a result of the processing. Since the target image display control unit 102 is notified of a fact that the image file of the target image is deleted, the target image is not necessarily displayed in the target image display space C1. Similarly, when the switching operation image D5, the shift operation image D6, and the slider operation image D7 are operated, the target image processing unit 107 processes corresponding operations.

Due to the above-described configuration, the image processing apparatus 10 performs display processing for displaying the target image and the operation image.

Figure 7:
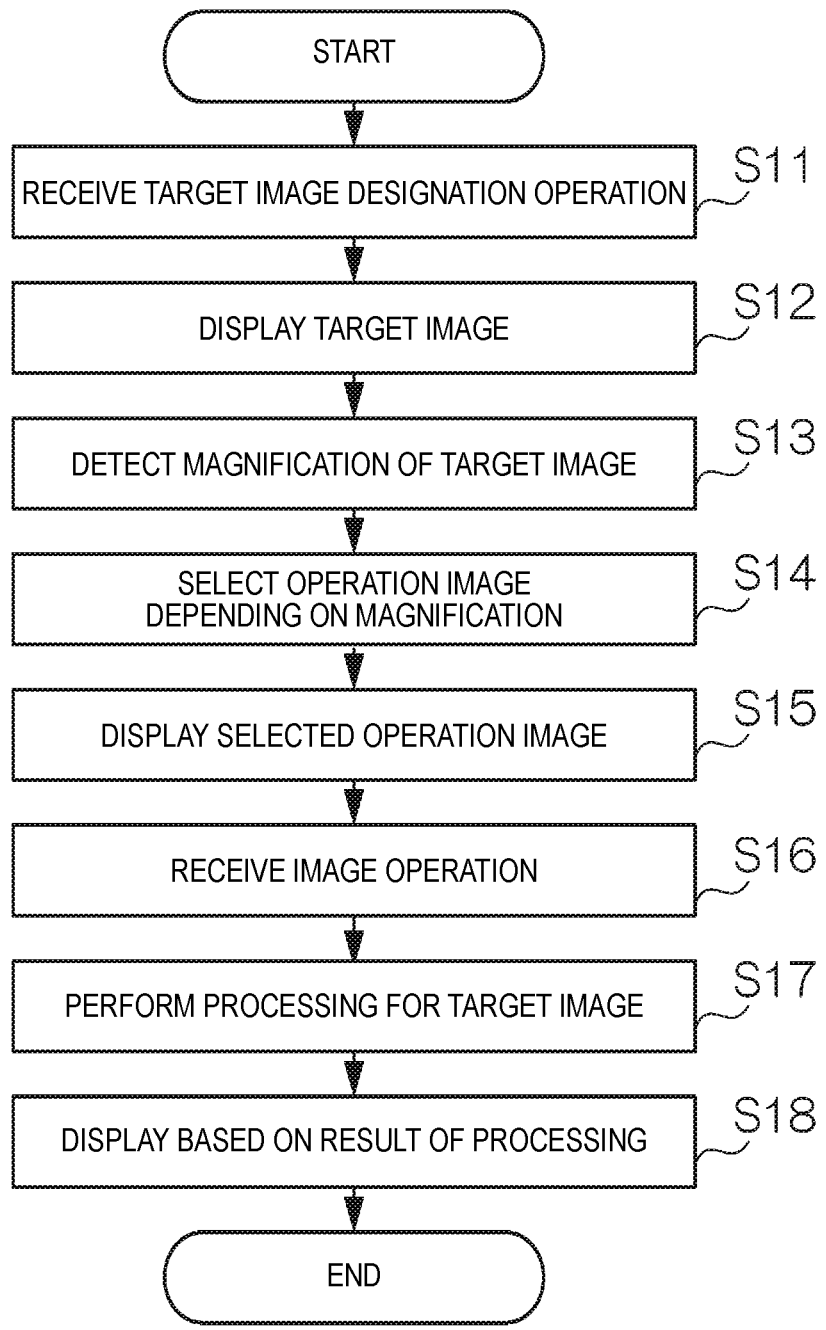
FIG. 7 is a flowchart illustrating an instance of an operational sequence of the image processing apparatus in display processing.

FIG. 7 illustrates an instance of an operational sequence of the image processing apparatus 10 in the display process. This operational sequence is started by being triggered at a user's operation for selecting the target image. First, the image processing apparatus 10 (target-image-designation operation receiving unit 101) receives an operation for selecting the target image (step S11).

Then, the image processing apparatus 10 (target image display control unit 102) displays the selected target image in the display unit (step S12). Subsequently, the image processing apparatus 10 (target image magnification detection unit 103) detects a magnification of the displayed target image (step S13). In addition, the image processing apparatus 10 (operation image selection unit 104) selects an operation image to be displayed depending on the detected magnification (step S14). Then, the image processing apparatus 10 (operation image display control unit 105) displays the selected operation image in the display unit (step S15).

As the displayed operation image is operated, the image processing apparatus 10 (image operation receiving unit 106) receives an operation for the operation image (step S16). Then, the image processing apparatus 10 (target image processing unit 107) processes the target image depending on the operated operation image (step S17). In addition, the image processing apparatus 10 (target image display control unit 102) displays a result of the processing (step S18).

According to this example, an operation image selected depending on the magnification of the target image is displayed. As a result, for instance, when plural operation images are displayed as illustrated in FIG. 4, the (selected) operation images may be displayed in a smaller display space compared to a case where all of them are displayed at all time. In addition, according to this exemplary embodiment, when the magnification of the target image is equal to or higher than the threshold value Th1, the operation images other than the first operation image are displayed. That is, a specific operation image(s) (first operation image) is not displayed. According to this example, when the magnification of the target image is lower than the threshold value Th2, the operation images other than the second operation image are displayed. That is, a specific operation image(s) (second operation image) is not displayed.

According to this example, when the magnification of the target image is equal to or higher than the threshold value Th3, a specific operation image(s) prescribed as the third operation image is displayed. In particular, when the magnification at which the outer circumference of the target image is not displayed is set to the threshold value Th3, and the image is enlarged so as not to display the outer circumference by setting the slider operation image as the third operation image, the operation image (slider operation image) is displayed so as to minutely control the size of the image. According to this example, when the magnification of the target image is lower than the threshold value Th4, a specific operation image(s) prescribed as the fourth operation image is displayed.

[2] Modifications

The above-described example is given as merely exemplary in the invention, and may be modified as follows. In addition, the example and the respective modifications may be combined with each other as needed.

[2-1] Enlargement/Reduction Operation

In the example described above, the enlargement operation image D1 and the reduction operation image D2 illustrated in FIG. 4 are 4-level enlargement/reduction operation images by switching the four modes. Alternatively, without limiting thereto, they may be operation images capable of enlarging or reducing the target image through more multiple levels. In this case, the target image display control unit 102 displays the target image by switching the mode, for instance, when the target image is enlarged or reduced to a specific magnification.

[2-2] Display Unit

In the example described above, the target image display control unit 102 and the operation image display control unit 105 displays the images (target image and/or operation image) on the operation panel 18 provided in own apparatus. Alternatively, without limiting thereto, the image may be displayed in an external display unit. In addition, the display unit may not be provided with a touch panel unlike the operation panel 18, and a simple display may also be employed. In this case, a user may perform the operation using a keyboard or a mouse.

[2-3] Selection Timing of Operation Image

In the example described above, the operation image selection unit 104 selects the displayed operation images when the target image is designated. Alternatively, the operation image may be selected at any other timing. For instance, it is assumed that the target image display screen A1 of FIG. 6D is displayed. In this screen, the operation image display control unit 105 displays a size-change operation image (including the enlargement operation image D1 and the reduction operation image D2) for receiving an operation for changing the size of the displayed target image and the slider operation image D7.

In this state, when the size-change operation image (any one of the enlargement operation image D1 and the reduction operation image D2) is operated, the operation image selection unit 104 excludes the slider operation image D7 from a list of the selection target operation images. As the operation image selection unit 104 supplies the result of selection to the operation image display control unit 105, the operation image display control unit 105 stops displaying the slider operation image D7 when the size-change operation image is operated on the target image display screen A1 of FIG. 6D.

According to this modification, the size-change operation image is used to change the size of the displayed image, and the slider operation image D7 is not used. Therefore, the slider operation image D7 may be less possibly used than the size-change operation image. According to this modification, when two types of operation images (including the size-change operation image and the slider operation image D7) are displayed to change the size of the displayed target image, a less possibly used operation image (that is, the slider operation image D7) is not displayed by stopping the display of the slider operation image D7.

Alternatively, the operation image selection unit 104 may select other operation images instead of the slider operation image D7. As a result, the operation image display control unit 105 displays any other operation image(s) instead of the slider operation image D7 whose display has stopped. Accordingly, any other more possibly used operation image is displayed on a space of the less possibly used slider operation image D7.

In the target image display screen A1 of FIG. 6D, the operation image display control unit 105 displays the enlargement operation image D1 and the slider operation image D7. In this state, when the magnification of the displayed target image changes to be lower than the threshold value Th5 by operating the slider operation image D7, the operation image selection unit 104 excludes the enlargement operation image D1 from a list of the selection target operation images. As the operation image selection unit 104 supplies a result of the selection to the operation image display control unit 105, the operation image display control unit 105 stops displaying the enlargement operation image D1 when the above-described operation is performed on the target image display screen A1 of FIG. 6D.

Even in this case, when two types of operation images (including the enlargement operation image D1 and the slider operation image D7) are displayed to change the size of the displayed target image, a less possibly used operation image (that is, the enlargement operation image D1) is not displayed by stopping display of the enlargement operation image D1.

Alternatively, the operation image selection unit 104 may select any other operation image instead of the enlargement operation image D1. As a result, the operation image display control unit 105 displays any other operation image instead of the enlargement operation image D1 whose display has stopped. As a result, another possibly used operation image is displayed in the space where the less possibly used enlargement operation image D1 has been displayed.

[2-4] Center Point of Enlargement/Reduction

When any of the enlargement operation image D1, the reduction operation image D2, and the slider operation image D7 is operated, the target image processing unit 107 performs an enlargement or reduction process for the displayed target image. In this case, a center point of enlargement or reduction of the target image may be changed depending on the situation.

For instance, when the displayed target image is operated for enlargement, the target image processing unit 107 performs a process of enlarging the target image based on a position depending on a file format of the data of the target image. The target image processing unit 107 performs this process using a center point table where the file format and a position of the center point are associated.

FIG. 8 illustrates an instance of the center point table. In this center point table, when the file format is set to an "image file" such as JPEG (joint photographic experts group) or BMP (bitmap image), a position of the center point is set to the "center of the target image display space". When the file format is a "document file" such as PDF or DOC, the "upper left corner of the document" is set as the position of the center point. The target image processing unit 107 performs the enlargement process based on the center point determined using the center point table. Therefore, when an operation for enlarging the displayed target image is performed, the target image display control unit 102 enlarges the target image based on the position depending on the file format of the data of the target image.

Specifically, when the file format of the target image is set to the image file, the target image display control unit 102 enlarges the target image based on the target image display space as a center point. When the file format of the target image is a file format of a document file, the target image is enlarged with the upper left corner of the target image as a center point. Since a user typically wants to enlarge the image file from the center of the displayed portion (that is, the center of the target image display space), a user feels less strange, compared to a case where any other position is set as the center point.

Typically, in the case of the document file, a user starts to read from the upper left corner. Therefore, when the enlargement is performed with the center of the displayed portion as the center point, the upper left corner may not be displayed. In this modification, the enlargement is performed using the center point depending on the file format of the target image, it is possible to make a user feel less strange in the enlarged image and easily display a portion of the image that a user wants to see, compared to a case where the target image is enlarged without considering the file format.

When a rectangular target image is displayed, and an operation is performed to enlarge the target image, the target image processing unit 107 may perform the enlargement process using the center point table as described below.

FIG. 9 illustrates another instance of the center point table. In this center point table, when a display state of a rectangle (for every target image) is set to "a corner of the rectangle is displayed" (for instance, as illustrated in FIGS. 6A and 6B), the "displayed corner" is set as the center point. In contrast, when the display state of the rectangle is set to "a corner is not displayed, but a side of the rectangle is displayed" (for instance, as illustrated in FIG. 6C), a "center of the displayed side" is set as the center point. When "neither corner nor side is displayed" (for instance, as illustrated in FIG. 6D), the "center of the target image display space" is set as the center point.

Since the target image processing unit 107 performs the enlargement process based on the center point determined using the center point table, the target image display control unit 102 performs control of the enlargement of the target image in the following way. Specifically, assuming that a rectangle target image is displayed, and an operation for enlarging the target image is performed, when a corner of the target image is displayed, the target image is enlarged based on the corner. When a corner of the target image is not displayed, but a side of the target image is displayed, the target image is enlarged based on a center of the side. When neither corner nor side of the target image is displayed, the target image is enlarged based on a center of the target image display space.

Alternatively, when plural corners of the target image are displayed as illustrated in FIGS. 6A and 6B, a priority may be given to each corner, and a corner having a higher priority may be set as the center. For instance, the priorities 1 to 4 may be given to the upper left corner, the upper right corner, the lower left corner, and lower right corner, respectively. In this case, in the state illustrated in FIGS. 6A and 6B, the target image display control unit 102 enlarges the target image based on the upper left corner of the target image.

While a corner or side of the rectangular image is displayed, a user highly possibly sees the vicinity of the corner or the side. However, in this case, when the enlargement is performed based on a center of the target image display space, the vicinity of the corner or the side that a user wants to see may not be displayed. In this regard, according to this modification, since the center of the enlargement is set depending on a display state of the rectangle as described above, it is possible to easily display an enlarged image including a portion that a user wants to see, compared to a case where the target image is enlarged without considering a display state of the rectangle.

Alternatively, when a rectangular target image is displayed, and an operation for selecting a position of the target image and an enlargement operation are performed, the target image processing unit 107 may perform the enlargement process based on the selected position.

Figure 10A:
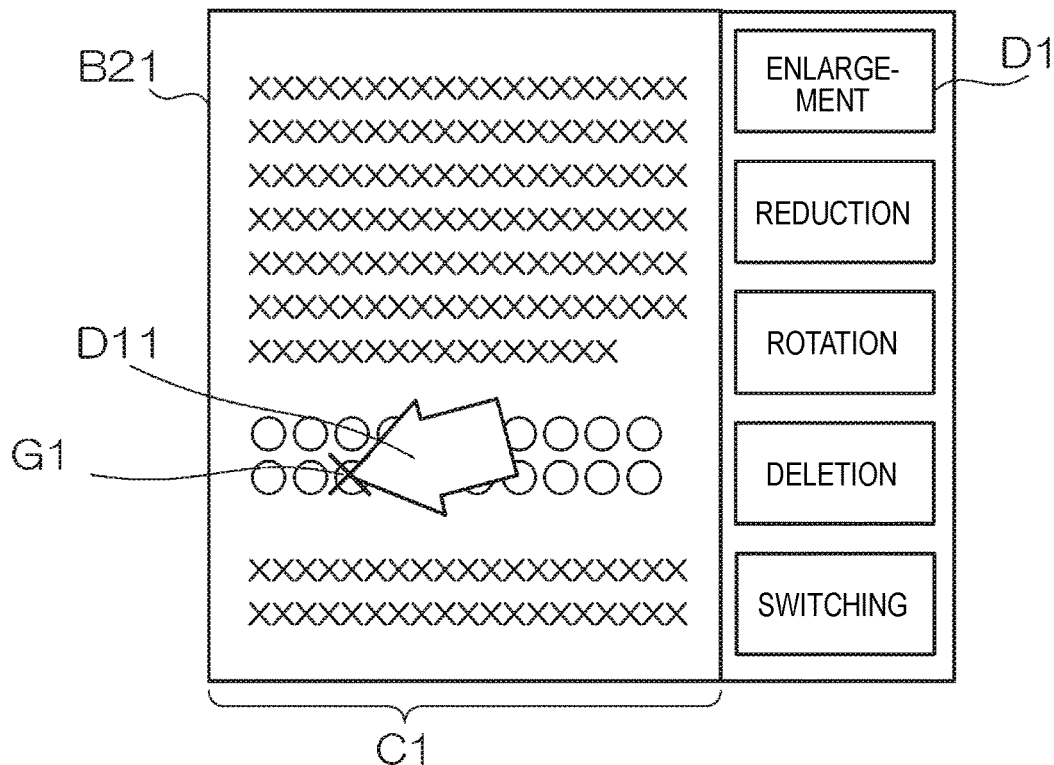
FIGS. 10A and 10B are schematic diagrams illustrating an instance of an enlarged target image according to a modification of the invention.

FIG. 10 is an instance of the target image enlarged according to this modification. FIG. 10A illustrates a state in which a user selects a specific position on the target image B21 using a position selection feature D11. The mark "X" on the target image B21 indicates a selected position G1.

Figure 10B:
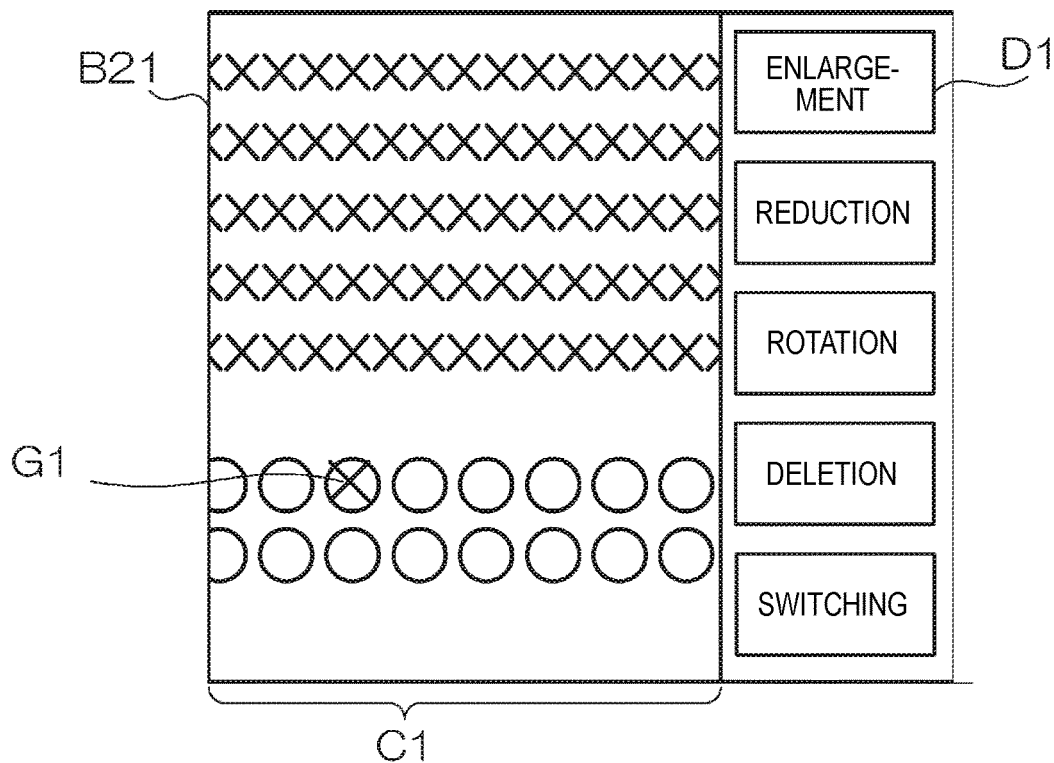

When a user operates the enlargement operation image D1 in this state, that is, when a user performs an operation for indicating a position on the displayed target image and an operation for enlarging the target image, the target image display control unit 102 enlarges the target image based on the indication position. A target image B21 enlarged in this manner is illustrated in FIG. 10B. A position of the selected position G1 on the target image display space C1 does not change before and after the enlargement. As a result, it is possible to enlarge the target image based on a position desired by a user.

[2-5] First to Fourth Operation Images

The first to fourth operation images are not limited to those described above. For instance, although the rotating operation image D3 and the switching operation image D5 are selected as the first operation image in the aforementioned instance, the enlargement operation image D1 may also be additionally selected as the first operation image. When the magnification of the target image is equal to or higher than the threshold value Th1, an operation for enlarging, rotating, or switching the target image is difficult more than other operation, compared to a case where the magnification is lower than the threshold value Th1. Therefore, by selecting the operation images for such operation as the first operation image, an operation image less possibly used than other operation images is not displayed when the magnification of the target image is equal to or higher than the threshold value Th1.

Although the shift operation image D6 and the slider operation image D7 are selected as the second operation image in the aforementioned instance, the reduction operation image D2 may also be additionally selected as the second operation image. When the magnification of the target image is lower than the threshold value Th2, an operation for enlarging or reducing the target image or an operation for enlarging or reducing the target image using the slider image across multiple levels is difficult more than other operations, compared to a case where the magnification is equal to or higher than the threshold value Th2. Therefore, by selecting the operation images for such operations as the second operation image, an operation image less possibly used than other operation images is not displayed when the magnification of the target image is lower than the threshold value Th2.

When the magnification of the target image is equal to or higher than the threshold value Th3, an operation for reducing or shifting the target image or an operation for enlarging or reducing the target image using the slider image across multiple levels is easier than other operations, compared to a case where the magnification is lower than the threshold value Th3. Therefore, by selecting the operation images for such operations as the third operation image, an operation image more possibly used than other operation images is displayed when the magnification of the target image is equal to or higher than the threshold value Th3.

When the magnification of the target image is lower than the threshold value Th4, an operation for enlarging, rotating, or switching the target image is easier than other operations, compared to a case where the magnification is equal to or higher than the threshold value Th4. Therefore, by selecting the operation images for such operations as the fourth operation image, an operation image more possibly used than other operation images is displayed when the magnification of the target image is lower than the threshold value Th4.

Although plural operation images are selected as each of the first to fourth operation images in the aforementioned instance, the invention is not limited thereto. Alternatively, one or more operation images may be selected. Similarly, in this case, an operation image less possibly used than other operation images in a display state of each target image is not displayed.

[2-6] Threshold Value

Although the threshold values Th1, Th2, Th3, and Th4 are set to the same value in the above-described example, the invention is not limited thereto. However, in this case, for instance, when a magnification of the target image is equal to or higher than the threshold value Th1 and is lower than the threshold value Th3, and the first operation image not displayed due to a condition that the magnification is equal to or higher than the threshold value Th1 is also selected as the third operation image displayed due to a condition that the magnification is lower than the threshold value Th3, it is difficult to determine whether or not the corresponding operation image is displayed. In this regard, the threshold value generating such a problem and the first to fourth operation images may not be selected.

[2-7] Category of Invention

The invention is implemented as an information processing method which realizes a process of the information processing apparatus besides the image processing apparatus for realizing the respective units illustrated in FIG. 2 similarly to the above-described image processing apparatus, and is implemented as a program which causes the computer to perform such a process. The program may be provided in the form of a recording medium such as an optical disc that stores the program therein, or may be installed and usable by being downloaded to the computer through a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor programmed to:
   display an image on a display; and
   concurrently display with the image on the display, an operation image selected from a group of operation images used to receive different operations with respect to the displayed image, depending on a magnification of the displayed image, with the proviso that:
      when the magnification of the displayed image is higher than a threshold value, and the information processing apparatus is thus in a page enlargement display mode in which a short side and a long side of an outer circumference of the displayed image are not displayed, an operation image that is not a prescribed first operation image is selected from the group of operation images and displayed, wherein the displayed operation image that is not the prescribed first operation image includes a slider operation image used to receive an operation for changing a size of the displayed image by changing a position of a slider image; and when the magnification of the displayed image is lower than the threshold value, and the short side and the long side of the outer circumference of the displayed image are displayed, the slider operation image is not displayed, and an operation image that is not the slider operation image is displayed from the group of operation images.

2. The information processing apparatus according to claim 1, wherein the processor is programmed to
when the magnification of the displayed image is equal to the threshold value, display the operation image that is not the prescribed first operation image from the group of operation images.

3. The information processing apparatus according to claim 2, wherein:
the prescribed first operation image is at least one of
an enlargement operation image used to receive an operation for enlarging the displayed image,
a rotating operation image used to receive an operation for rotating the displayed image, and
a switching operation image used to receive an operation for switching to display an image different from the displayed image.

4. The information processing apparatus according to claim 1, wherein the processor is programmed to
when the magnification of the displayed image is lower than the threshold value, display the operation image that is not the slider operation image and is not a prescribed second operation image from the group of operation images.

5. The information processing apparatus according to claim 4, wherein
the prescribed second operation image is at least one of
a reduction operation image used to receive an operation for reducing the displayed image, and
a shift operation image used to receive an operation for displaying an indication position image that represents an indication position and for shifting the displayed image by shifting the indication position image.

6. The information processing apparatus according to claim 1, wherein the processor is programmed to:
when the magnification of the displayed image is equal to or higher than the threshold value, additionally display another operation image from the group of operation images.

7. The information processing apparatus according to claim 6, wherein
the another operation image is at least one of
a reduction operation image used to receive an operation for reducing the displayed image, and
a shift operation image used to receive an operation for displaying an indication position image that represents an indication position and for shifting the displayed image by shifting the indication position image.

8. The information processing apparatus according to claim 1, wherein
the threshold value is a magnification in a state where the outer circumference of the displayed image is not displayed in a display space of the displayed image.

9. The information processing apparatus according to claim 1, wherein the processor is programmed to:
in a state where a size-change operation image used to receive an operation for changing a size of the displayed image and the slider operation image are displayed, stop displaying the slider operation image when the size-change operation image is operated.

10. The information processing apparatus according to claim 1, wherein the processor is programmed to:
in a state where an enlargement operation image used to receive an operation for enlarging a size of the displayed image and the slider operation image are displayed, stop displaying the enlargement operation image when the magnification is changed to be smaller than the threshold value by operation of the slider operation image.

11. The information processing apparatus according to claim 1, wherein the processor is programmed to:
when the magnification is lower than the threshold value, additionally display another operation image from the group of operation images.

12. The information processing apparatus according to claim 11, wherein
the another operation image is at least one of
an enlargement operation image used to receive an operation for enlarging the displayed image,
a rotating operation image used to receive an operation for rotating the displayed image, and
a switching operation image used to receive an operation for switching to display an image different from the displayed image.

13. The information processing apparatus according to claim 1, wherein the processor is programmed to:
enlarge the displayed image based on a position depending on a file format of data representing the displayed image when an operation for enlarging the displayed image is performed.

14. The information processing apparatus according to claim 1, wherein the processor is programmed to:
when displaying a rectangular image and performing an operation for enlarging the rectangular image, enlarge the displayed image (i) based on a corner in a case where the corner of the displayed image is displayed, (ii) based on a center position of a side in a case where the side of the displayed image is displayed and the corner is not displayed, and (iii) based on a center position of a space where the displayed image is displayed in a case where neither the corner nor the side is displayed.

15. The information processing apparatus according to claim 1, wherein the processor is programmed to:
when an operation for indicating a position on the displayed image and an operation for enlarging the displayed image are performed, enlarge the displayed image from the indicated position.

16. An information processing method comprising:
displaying an image on a display; and
concurrently displaying with the image on the display, an operation image selected from a group of operation images used to receive different operations with respect to the displayed image, depending on a magnification of the displayed image, with the proviso that:

when the magnification of the displayed image is higher than a threshold value, and the image is thus displayed in a page enlargement display mode in which a short side and a long side of an outer circumference of the displayed image are not displayed, an operation image that is not a prescribed first operation image is selected from the group of operation images and displayed, wherein the displayed operation image that is not the prescribed first operation image includes a slider operation image used to receive an operation for changing a size of the displayed image by changing a position of a slider image; and when the magnification of the displayed image is lower than the threshold value, and the short side and the long side of the outer circumference of the displayed image are displayed, the slider operation image is not displayed, and an operation image that is not the slider operation image is displayed from the group of operation images.

* * * * *